(12) United States Patent
Beilschmidt et al.

(10) Patent No.: US 11,592,797 B2
(45) Date of Patent: Feb. 28, 2023

(54) CONTROL PROGRAM AND METHOD FOR OPERATING AN ENGINEERING SYSTEM FOR AN INDUSTRIAL PROCESS AUTOMATION SYSTEM

(71) Applicant: Siemens Aktiengesellschaft, Munich (DE)

(72) Inventors: Dirk Beilschmidt, Bornheim (DE); Lyudmila Zhelyabovskaya, Bonn (DE); Alexander Wojciechowski, Bonn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 793 days.

(21) Appl. No.: 16/489,396

(22) PCT Filed: Feb. 6, 2018

(86) PCT No.: PCT/EP2018/052893
§ 371 (c)(1),
(2) Date: Aug. 28, 2019

(87) PCT Pub. No.: WO2018/158050
PCT Pub. Date: Sep. 7, 2018

(65) Prior Publication Data
US 2019/0391553 A1    Dec. 26, 2019

(30) Foreign Application Priority Data

Feb. 28, 2017    (EP) .................................... 17158401

(51) Int. Cl.
*G06F 16/00*    (2019.01)
*G05B 19/042*    (2006.01)
*G06F 16/28*    (2019.01)

(52) U.S. Cl.
CPC ....... *G05B 19/0426* (2013.01); *G06F 16/289* (2019.01); *G05B 2219/33148* (2013.01)

(58) Field of Classification Search
CPC ...... G05B 19/0426; G05B 2219/33148; G06F 16/289
See application file for complete search history.

(56) References Cited

U.S. PATENT DOCUMENTS 5,991,858 A * 11/1999 Weinlander ......... G06F 12/1441
711/163
6,063,128 A    5/2000 Bentley et al.
(Continued)

FOREIGN PATENT DOCUMENTS

| CN | 1527984 | 9/2004 |
|----|---------|--------|
| CN | 1529837 | 9/2004 |

(Continued)

OTHER PUBLICATIONS

Ruth Bergman et al (Jet Propulsion Laboratory/California Institute of Technology, Automated Workflow for Engineering Services12, 2002 IEEE (Year: 2002) (Year: 2002).*

(Continued)

*Primary Examiner* — Ashish Thomas
*Assistant Examiner* — Suman Rajaputra
(74) *Attorney, Agent, or Firm* — Cozen O'Connor

(57) ABSTRACT

An engineering system for an industrial process automation system, wherein components of the industrial process automation system are each represented by a computer-based object within the engineering system and are continuously stored in an engineering database, where functions of the engineering system are made available as services via a standard service interface, process sequences and states for retrieving or processing objects stored in the engineering database are stored in an order database that is separate from (Continued)

the engineering database, and access to process sequences and states that are stored in the order database occurs via an order interface that is separate from the standard service interface.

13 Claims, 3 Drawing Sheets

(56) References Cited

U.S. PATENT DOCUMENTS

| | | |
|---|---|---|
| 2003/0014322 A1 | 1/2003 | Kreidler et al. |
| 2007/0061786 A1 | 3/2007 | Zhou et al. |
| 2008/0082636 A1 | 4/2008 | Hofmann et al. |
| 2010/0211633 A1 | 8/2010 | Dingfelder et al. |
| 2010/0222896 A1 | 9/2010 | Braun et al. |
| 2014/0336795 A1 | 11/2014 | Asenjo et al. |
| 2019/0124142 A1* | 4/2019 | Bartolome Rodrigo ............... H04L 61/4511 |

FOREIGN PATENT DOCUMENTS

| | | | |
|---|---|---|---|
| CN | 1529837 A | * 9/2004 | ........... G05B 19/042 |
| CN | 104142660 | 11/2014 | |
| CN | 104142660 A | * 11/2014 | ......... G05B 19/4083 |
| EP | 0166215 | 1/1968 | |
| EP | 0221694 | 5/1987 | |
| EP | 0528396 A2 | 2/1993 | |
| EP | 1784695 | 5/2007 | |
| EP | 1906274 | 4/2008 | |
| EP | 2224300 | 9/2010 | |
| EP | 2808749 | 12/2014 | |
| EP | 3051369 | 8/2016 | |
| JP | H 05-210478 | 8/1993 | |
| JP | H 05210478 | 8/1993 | |
| WO | WO 03/007097 | 1/2003 | |

OTHER PUBLICATIONS

Office Action dated Oct. 11, 2021 issued in Chinese Patent Application No. 201880014395.7.

* cited by examiner

CONTROL PROGRAM AND METHOD FOR OPERATING AN ENGINEERING SYSTEM FOR AN INDUSTRIAL PROCESS AUTOMATION SYSTEM

CROSS-REFERENCE TO RELATED APPLICATIONS

This is a U.S. national stage of application No. PCT/EP2018/052893 filed Feb. 6, 2018. Priority is claimed on EP Application No. EP17158401 filed Feb. 28, 2017, the entire content of which is incorporated herein by reference in its entirety.

BACKGROUND OF THE INVENTION

1. Field of the Invention

The invention relates to industrial automation systems and, more particularly, to a control program and method for operating an engineering system for an industrial process automation system.

2. Description of the Related Art

Industrial automation systems are used for monitoring and open-loop and closed-loop control of technical processes, especially in the fields of manufacturing, process and building automation, and enable an essentially autonomous operation of control devices, sensors, machines and technical systems. An essential foundation for a reliable provision of monitoring, open- and closed-loop control functions by means of a process automation system consists in a complete and correct recording and modeling of components of the industrial process automation system in an engineering or project planning system.

An engineering system can be used in particular to develop control programs for automation devices, which are designed to visualize a model of a technical system or a complex machine and its open-loop or closed-loop control. At the run time of the control programs or during a runtime operation, a technical process is open-loop or closed-loop controlled by automation devices, such as programmable logic controllers. As part of process monitoring during the run-time operation, an operator can call up process images in order to obtain an overview of a current system status and perform process management or operation.

EP 1 166 215 B1 describes a method for the automatic recovery of engineering data of technical systems, in which engineering and runtime objects are described by a standard object model. This allows a direct correlation between engineering objects and runtime objects on the object plane, so that no loss of information arises from a mapping of system components on to the object model. In addition, a direct communication can occur between engineering and runtime objects.

EP 2 808 749 B1 discloses a method for exchanging control information between operating and monitoring devices of an industrial automation system. On the basis of the control information, an at least partial model of a technical system controlled using automation devices is visualized on a graphical user interface of a respective control and monitoring device. The visualized model is assigned computer-based objects representing elements of the technical system, which are provided by a run-time environment configured on a respective control and monitoring device. All of the object types provided on different control and monitoring devices are made available according to a standard addressing scheme for a device-independent access.

U.S. Pat. No. 6,063,128 relates to a system comprising a storage device, a first and second hardware or software platform, a persistent portable data model and computer-based modeling systems, which are dependent on the first and second platform. Each platform has an interface to the storage device and provides system-dependent services. The first platform is assigned a first operating system type and a first computer hardware type, while the second platform is assigned a second operating system type as well as a second computer hardware type. The portable data model is stored in the memory device in a platform-independent format and comprises persistent component objects. In addition, the computer-based modeling system for the first platform is stored in a first storage area of the memory device, while the computer-based modeling system for the second platform is stored in a second storage area of the memory device. Each computer-based modeling system provides services in order to retrieve the portable data model from the memory device, to modify the data model by adding and removing component objects and to store the data model persistently in the memory device. In addition, each computer-based modeling system comprises a static kernel and a dynamic software framework. The kernels run on the respective platform and form interfaces to the associated operating system and to the corresponding computer hardware. The software frameworks run on the respective platform, form interfaces to the associated kernel and each provide a platform-independent graphical user interface.

System data managed via an engineering system are subject to constant adjustments and changes during a life cycle of a technical system, in particular in the context of maintenance or modernization work. As part of this, highly heterogeneous user groups usually access the system data using different static or mobile control devices. EP 1 906 274 A2, EP 3 051 369 A1 and EP 2 221 694 A1 describe conventional methods for access to engineering and configuration data of a distributed technical system.

SUMMARY OF THE INVENTION

It is an object of the invention to provide a control program and a method for operating an engineering system for an industrial process automation system, which enables access to engineering data by means of numerous different control units and an adaptation of process flows for search and/or processing requests in productive operation.

This and other objects and advantages are achieved in accordance with the invention by a control program and method for operating an engineering system for an industrial process automation system, in which components of the industrial process automation system are each represented by a computer-based object within the engineering system and are continuously stored in at least one engineering database associated with at least one server of the engineering system. The objects are managed by the server within a hierarchical object structure, where the object structure comprises dependencies between objects. Functions of the engineering system are made available by the server via a standard service interface as services for use by clients of different types.

The standard service interface is formed in accordance with the invention via a gateway, which is assigned to the server and via which the services of the engineering system are made available on a client-specific basis. For client-specific service requests, at least one respective client type is identified. On the basis thereof, client-specific service requests are forwarded to a client-specific service access point of the gateway. In this way, the services of the engineering system can be made available for a plurality of different client device types.

In accordance with the invention, the objects stored in the engineering database comprise operationally use productive data of a technical system. On the other hand, process sequences and states for querying or processing objects stored in the engineering database are stored in an order database separate from the engineering database. The process sequences and states are represented by order processing objects within the order database and comprise event-dependent state transitions during querying or processing of objects stored in the engineering database. Objects stored in the engineering database are queried and/or processed by an order processing service via the order processing objects stored in the order database. Furthermore, access to process sequences and states stored in the order database occur via a server-side order interface separate from the standard service interface. By a decoupled provision of the services of the engineering system and the order interface as well as a separation of the engineering database and the order database, process sequences for search and/or processing requests can be adapted easily and without direct access to productively used system data.

In accordance with a preferred embodiment of the method in accordance with the invention, the services of the engineering system and the order processing service output event messages usable by other services via a standard event interface. The event messages can be selected by the services of the engineering system and/or the order processing service to provide event-driven control. In this way, services provided independently of each other can be linked together reliably and efficiently.

Preferably, the order interface is made available on a client-specific basis via the gateway associated with the server. Advantageously, at least one respective client type is identified for client-specific access requests to the order interface. On the basis thereof, client-specific service accesses are forwarded to a client-specific access point of the gateway. In this way, the order interface can be made available for a plurality of different client device types. In accordance with a further advantageous embodiment of the present invention, clients are authenticated via the gateway for use of the services of the engineering system and the order interface. Furthermore, the engineering system can comprise a plurality of servers, to which client-side service requests are forwarded for processing depending on usage. This means a simple scaling of the engineering system is possible.

In accordance with a further advantageous embodiment of the method in accordance with the invention, objects specified by a user selection for processing are loaded from the engineering database into at least one processing memory area. One access-authorized user is assigned to the objects and the processing memory area in each case. A first processing memory area, which as an access-authorized user is assigned to a second processing memory area, is hierarchically superior to the second processing memory area. Therefore, a first object in a higher-ranked processing memory area, which has an identical object identifier to a second object in a lower-ranked processing memory area, is the predecessor of the second object.

If the client side initiates a user release of objects loaded into a selected processing memory area that are to be released, then a test is performed to determine whether the selected processing memory area is assigned an immediately higher-ranked processing memory area. In the event of a negative test result, the objects to be released loaded into the selected processing memory area are written back into the engineering database. Otherwise, objects are written back into the immediately higher-ranked processing memory area. In this way, a plurality of different users can perform project planning tasks.

Preferably, one level information item is assigned to each of the processing memory areas. The level information assigned to a selected processing memory area differs from the level information assigned to an immediately higher-ranked processing memory area by one step. Therefore, a first object in a higher-ranked processing memory that has an identical object identifier to a second object in a lower-ranked processing memory area and a matching access-authorized user, is the direct predecessor of the second object.

In accordance with a particularly preferred embodiment of the present invention, objects loaded into a processing memory area are displayed on a client-side graphical user interface superimposed on objects stored in the database. In a similar way, objects loaded into a lower-ranked processing memory area are displayed on the client-side graphical user interface superimposed on objects loaded into a higher-ranked processing memory area. In this way, only data actually required for processing are loaded into the at least one user memory area while other system data used productively in the engineering database will remain unchanged.

The non-transitory computer-readable medium, having a control program in accordance with the invention for operating an engineering system for an industrial process automation system, can be loaded into a working memory of a computer and has at least one code section, during the execution of which the steps explained above are performed when the control program is running on the computer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is described in more detail below for an exemplary embodiment by reference to the drawing, in which.

DETAILED DESCRIPTION OF THE EXEMPLARY EMBODIMENTS

Figure 1:
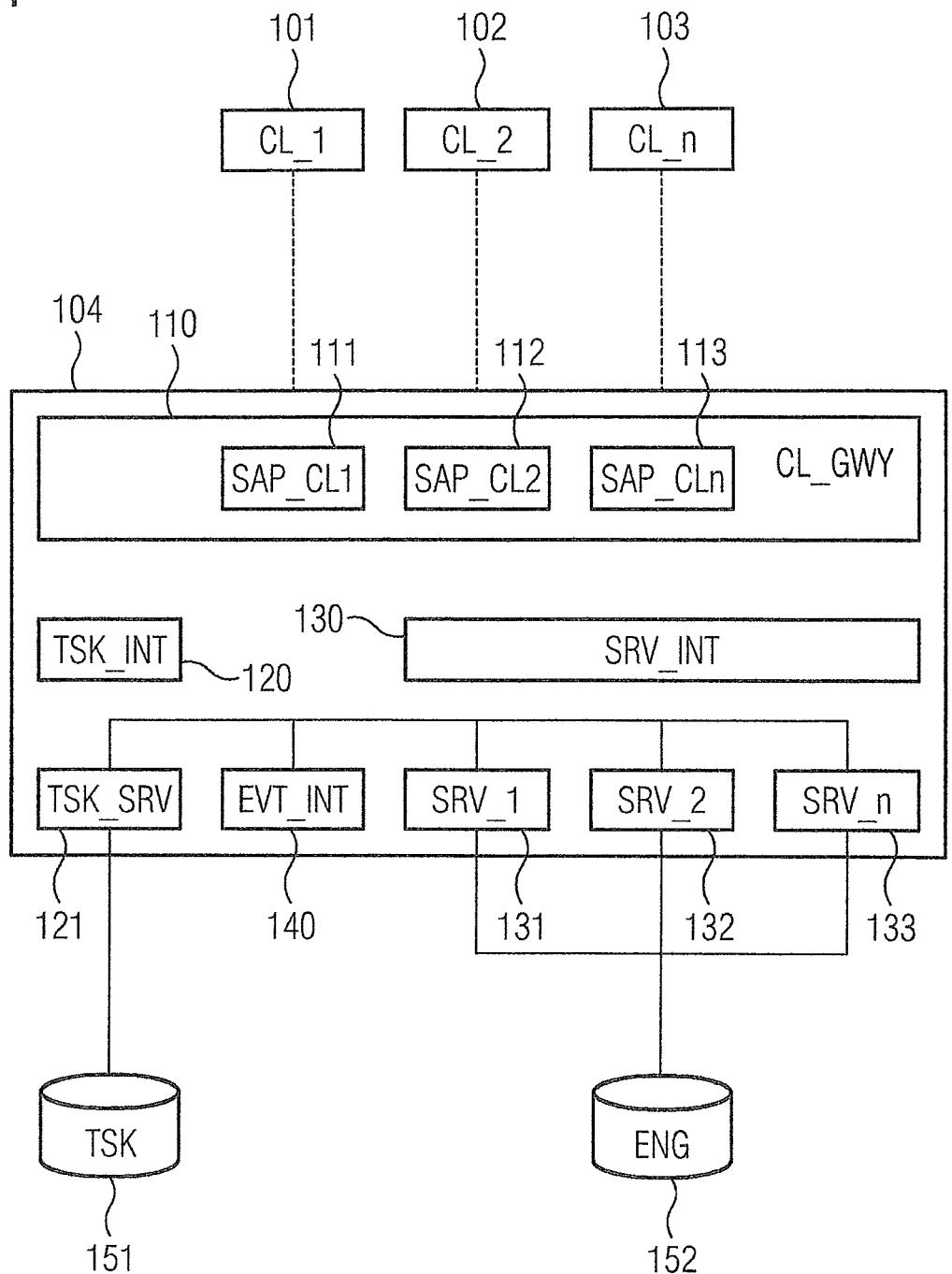
FIG. 1 shows an arrangement with multiple clients and a server of an engineering system for an industrial process automation system in accordance with the invention.

The arrangement shown in FIG. 1 comprises a server 104 of an engineering system for an industrial process automation system, in which components of the industrial process automation system are each represented by a computer-based engineering object and are persistently stored in a server-side engineering database 152. The engineering objects are managed by the server 104 within a hierarchical object structure. This object structure comprises dependencies between the engineering objects. Functions of the engineering system are made available for a plurality of stationary or mobile clients 101, 102, 103, which can vary widely in terms of device type, hardware platform or software platform, as services 131, 132, 133 via a server-side standard service interface 130. Client-side search and/or processing requests directed to engineering objects stored in the engineering database 152 are forwarded to an order processing service 121.

The objects stored in the engineering database 152 comprise operationally used productive data of a technical system. By contrast, process sequences and states for querying or processing objects stored in the engineering database 152 are stored in an order database 151 that is separate from the engineering database 152. The process sequences and states are represented by order processing objects within the order database 152 and comprise event-dependent state transitions during querying or processing of objects stored in the engineering database 152. Objects stored in the engineering database 152 are queried and/or processed by an order processing service 121 via the order processing objects stored in the order database 151. For access to process sequences and process states stored in the order database 151, a server-side order interface separate from the standard service interface is provided.

The services 131, 132, 133 of the engineering system and of the order processing service 121 output event messages usable by other services via a standard event interface 140, which are selectable or can be subscribed to by the services 131, 132, 133 of the engineering system and/or the order processing service 121 to provide event-driven control.

The standard service interface 130 is formed via a gateway 110, which is assigned to the server 104 and by means of which the services 131, 132, 133 of the engineering system are made available on a client-specific basis. For client-specific service requests a respective client type is identified. On the basis thereof, client-specific service requests are forwarded to a client-specific service access point 111, 112, 113 of the gateway 110.

The order interface 120 is also made available on a client-specific basis via the server-side gateway 110. To this end, the gateway 110 identifies a respective client type for client-side accesses to the order interface 120. On the basis thereof, client-specific access requests are forwarded to one of a plurality of client-specific access points 111, 112, 113 of the gateway 110. In addition, the gateway 110 is provided for authenticating clients 101, 102, 103 to use the services 131, 132, 133 of the engineering system and the order interface 120. In principle, the engineering system can comprise a plurality of servers, which in principle are configured in the same way as the server 104, and to which client-side service requests are forwarded for processing in a usage-dependent manner.

By creation of processing memory areas of the engineering system, which are referred to hereafter as working layers, engineering data and system objects can be processed in parallel by a plurality of users. When processing engineering objects in working layers, an original database of a technical system remains unchanged until further notice. Only after processing, any changes made to the engineering objects are consolidated with the original database as part of a release process and are released into a productive data inventory of the system which is used operationally.

Engineering objects, specified by a user selection, are loaded from the engineering database 152 into at least one working layer in read and write mode for processing. At least one access-authorized user or owner is assigned to the engineering objects and the working layer in each case. In addition to the engineering objects loaded from the engineering database 152, new engineering objects can be generated in a working layer.

Working layers can have hierarchical dependencies on other working layers. A first working layer, which is assigned as owner to a second working layer, is ranked higher in the hierarchy than the second working layer. As a result, a first engineering object in a higher-ranked working layer, which has an identical object identifier to a second engineering object in a lower-ranked working layer, is the predecessor of the second object. In this exemplary embodiment, the working layers are each assigned one level information item. The level information assigned to a selected working layer differs from the level information assigned to an immediately lower-ranked working layer by exactly one level. A first engineering object in an immediately higher-ranked working layer, which has an identical object identifier to a second engineering object in a lower-ranked working layer and the same owner, is the immediate predecessor of the second engineering object.

If the client side initiates a release process of the engineering objects to be released that are loaded into a selected working layer, a test is performed to determine whether an immediately higher-ranked working layer is assigned to the selected working layer. In the event of a negative test result, the objects loaded into the selected working layer that are to be released are written back into the engineering database 152. Otherwise, the engineering objects loaded into the selected working layer that are to be released are written back into the immediately higher-ranked working layer.

Figure 2:
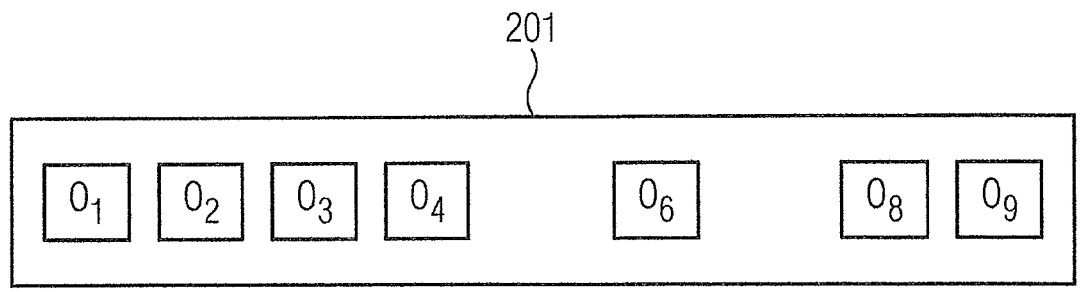
FIG. 2 shows a schematic representation of a superposition of processing memory areas in a graphical user interface of a client.
Figure 2:
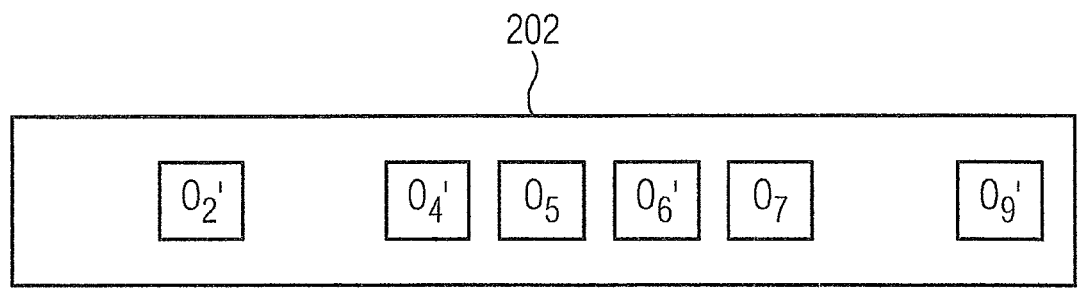
Figure 2:
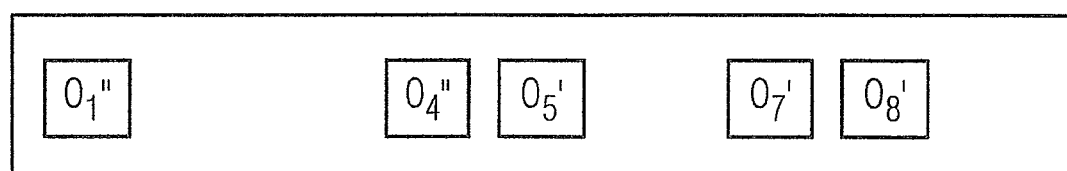
Figure 2:
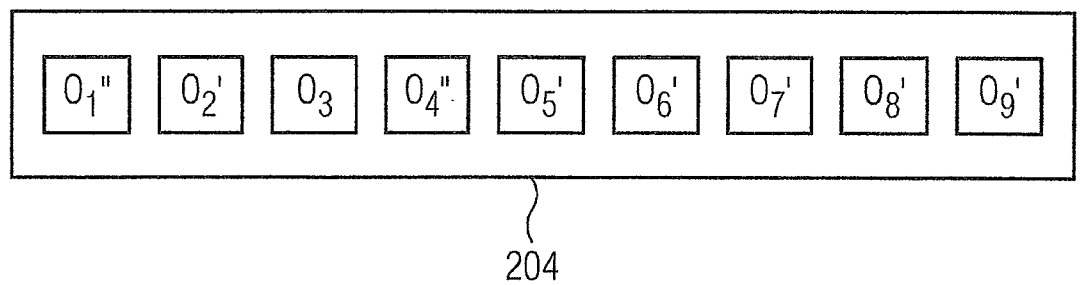

According to the superposition of working layers 202, 203 on a client-side graphical user interface 204 shown schematically in FIG. 2, engineering objects $O_1''$, $O_4''$, $O_5'$, $O_7'$, $O_8'$ loaded into a selected working layer 203 are shown, on the one hand, superimposed on the productive data inventory $O_1$-$O_4$, $O_6$, $O_8$-$O_9$ stored in the server-side database. On the other hand, these engineering objects $O_1$, $O_4''$, $O_5'$, $O_7'$, $O_8'$, are shown superimposed on engineering objects $O_2'$, $O_4'$, $O_5'$, $O_6'$, $O_7'$, $O_9'$ loaded into a higher-ranked working layer 202. On the graphical user interface 204, in accordance with the example shown in FIG. 2, the resulting engineering objects $O_1''$, $O_2'$, $O_3'$, $O_4''$, $O_5'$, $O_6'$, $O_7'$, $O_8'$, $O_9'$ are visible.

Figure 3:
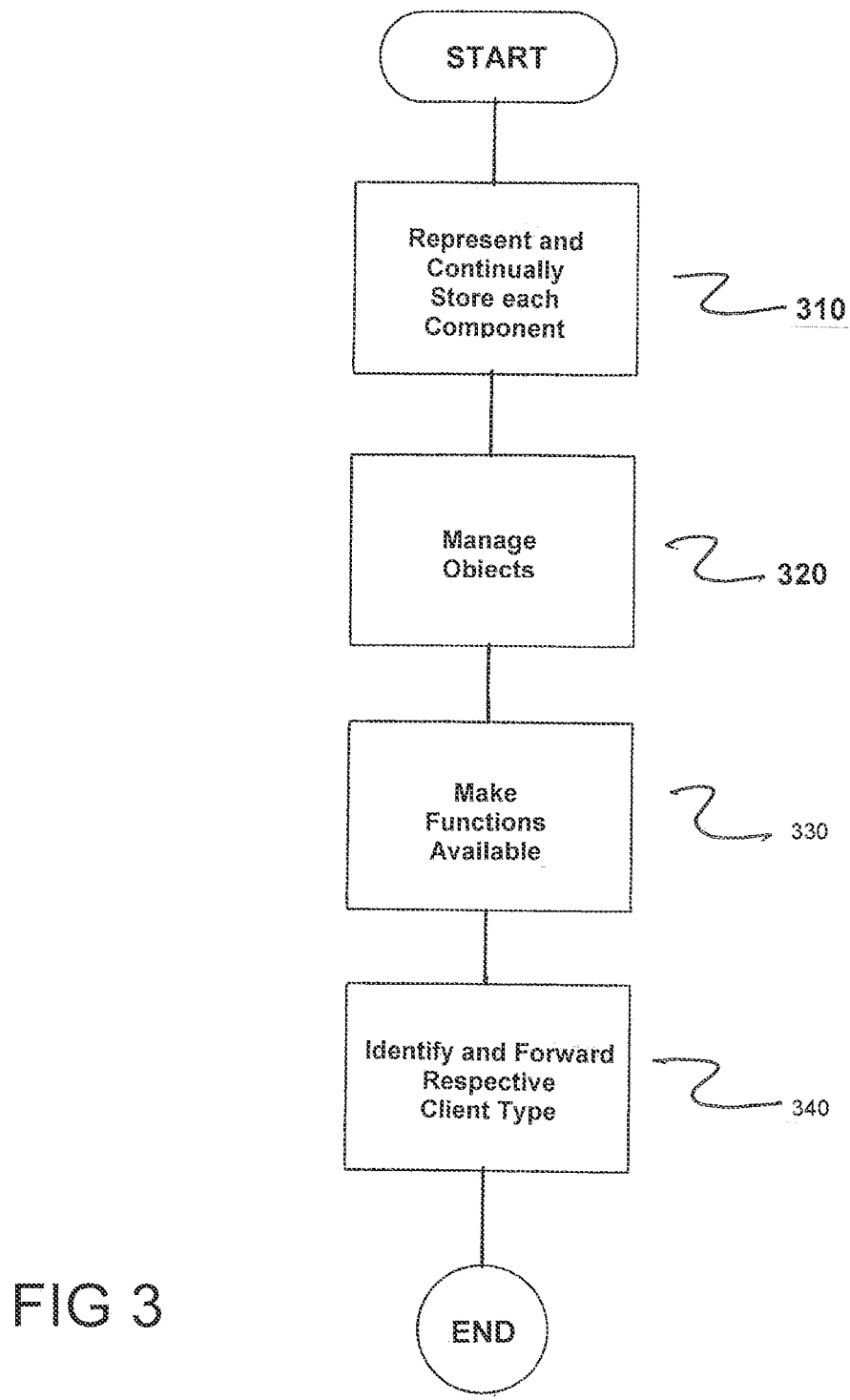
FIG. 3 shows a flowchart of the method in accordance with the invention.

FIG. 3 is a flowchart of the method for operating an engineering system for an industrial process automation system. The method comprises representing each component of the industrial process automation system by a computer-based object within the engineering system and continually storing the component in at least one engineering database 152 associated with at least one server 104 of the engineering system, as indicated in step 310.

Next, the objects by the server are managed within a hierarchical object structure, as indicated in step 320. Here, the object structure comprise dependencies between objects. Next, functions of the engineering system are made available by the server via a standard service interface 130 as services 131, 132, 133 for utilization by clients of different types, as indicated in step 330. Here, the standard service interface 130 is formed via a gateway 110, which is assigned to the server 104 and via which the services 131, 132, 133 of the engineering system are made available on a client-specific basis.

Next, at least one respective client type is identified for client-specific service requests and forwarding to a client-specific service access point 111, 112, 113 of the gateway 110 based on the identified at least one respective client type, as indicated in step 340.

In accordance with the invention, the objects stored in the engineering database 152 comprise operationally utilized productive data of a technical system. Moreover, process sequences and states for either querying and/or processing objects stored in the engineering database 152 are stored in an order database 151 separate from the engineering database 152. Furthermore, the process sequences and states are represented by order processing objects within the order database 152 and comprise event-driven state transitions in an event of either the query and/or processing of objects stored in the engineering database 152.

In accordance with the invention, objects stored in the engineering database 152 are either queried and/or processed by an order processing service 121 via the order processing objects stored in the order database 151. Moreover, access to process sequences and states stored in the order database 151 occurs via a server-side order interface 120 separate from the standard service interface 130.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an engineering system for an industrial process automation system, the method comprising:
   representing each component of the industrial process automation system by a computer-based object within the engineering system and continually storing said component in at least one engineering database associated with at least one server of the engineering system;
   managing the objects by the server within a hierarchical object structure, the object structure comprising dependencies between objects;
   making available functions of the engineering system by the server via a standard service interface as services for utilization by clients of different types, the standard service interface being formed via a gateway, which is assigned to the server and via which the services of the engineering system are made available on a client-specific basis; and
   identifying at least one respective client type for client-specific service requests and forwarding said client-specific service requests to a client-specific service access point of the gateway based on said identified at least one respective client type;
   wherein the objects stored in the engineering database comprise operationally utilized production data of a technical system;
   wherein process sequences and states for at least one of (i) querying and (ii) processing objects stored in the engineering database are stored in an order database separate from the engineering database;
   wherein the process sequences and states are represented by order processing objects within the order database and comprise event-driven state transitions in an event of at least one of (i) the query and (ii) processing of objects stored in the engineering database;
   wherein objects stored in the engineering database are at least one of (i) queried and (ii) processed by an order processing service via the order processing objects stored in the order database;
   wherein access to process sequences and states stored in the order database occurs via a server-side order interface separate from the standard service interface.

2. The method as claimed in claim 1, wherein the services of the engineering system and the order processing service output event messages utilizable by other services via a standard event interface, said output event messages being selectable by at least one of (i) the services of the engineering system and (ii) the order processing service to provide event-driven control.

3. The method as claimed in claim 1, wherein the order interface is made available on a client-specific basis via the gateway associated with the server.

4. The method as claimed in claim 2, wherein the order interface is made available on a client-specific basis via the gateway associated with the server.

5. The method as claimed in claim 3, wherein for client-specific accesses to the order interface at least one respective client type is identified and on the basis thereof, client-specific accesses are forwarded to a client-specific access point of the gateway.

6. The method as claimed in claim 3, wherein clients are authenticated via the gateway for utilization of the services of the engineering system and the order interface.

7. The method as claimed in claim 5, wherein clients are authenticated via the gateway for utilization of the services of the engineering system and the order interface.

8. The method as claimed in claim 1, wherein the engineering system comprises a plurality of servers, to which client-side service requests are forwarded for processing depending on usage.

9. The method as claimed in claim 1, wherein objects specified for processing by a user selection are loaded from the engineering database into at least one processing memory area;
   wherein the objects and the processing memory area are each assigned one access-authorized user, in which a first processing memory area, which is assigned as an access-authorized user to a second processing memory area, is hierarchically superior to the second processing memory area;
   wherein a first object in a higher-ranked processing memory area which has an identical object identifier to a second object in a lower-ranked processing memory area is a predecessor of the second object, a test being performed to determine whether a selected processing memory area is assigned an immediately higher-ranked processing memory area when the client-side initiates a user release of objects loaded into a selected processing memory area that are to be released;

wherein in an event of a negative test result the objects loaded into the selected processing memory area to be released are written back into the engineering database; and wherein in and event of a positive test result the objects loaded into the selected processing memory area to be released are written back into the immediately higher-ranked processing memory area.

10. The method as claimed in claim 9, wherein processing memory areas are each assigned one level information item;

wherein level information assigned to a selected processing memory area differs from level information assigned to an immediately higher-ranked processing memory area by one step, and wherein a first object in an immediately higher-ranked processing memory area, which has an identical object identifier to a second object in a subordinate processing memory area and a matching access authorized user, is a direct predecessor of the second object.

11. The method as claimed in claim 9, wherein objects loaded into a processing memory area are displayed on a client-side graphical user interface as superimposed on objects stored in the database; and wherein objects loaded into a lower-ranked processing memory area are displayed on the client-side graphical user interface as being superimposed on objects loaded into a higher-ranked processing memory area.

12. The method as claimed in claim 10, wherein objects loaded into a processing memory area are displayed on a client-side graphical user interface as superimposed on objects stored in the database; and wherein objects loaded into a lower-ranked processing memory area are displayed on the client-side graphical user interface as being superimposed on objects loaded into a higher-ranked processing memory area.

13. A non-transitory computer-readable medium encoded with a control program including at least one section of code which, when loaded into a working memory of a computer executed causes the operation of an engineering system for an industrial process automation system, the control program comprising:

program code for representing each component of the industrial process automation system by a computer-based object within the engineering system and for continually storing said components in at least one engineering database associated with at least one server of the engineering system;

program code for managing the objects by the server within a hierarchical object structure, the object structure comprising dependencies between objects;

program code for making available functions of the engineering system as services by the server via a standard service interface for utilization by clients of different types, the standard service interface being formed via a gateway, which is assigned to the server and via which the services of the engineering system are made available on a client-specific basis; and program code for identifying at least one respective client type for client-specific service requests and for forwarding said client-specific service requests to a client-specific service access point of the gateway based on said identified at least one respective client type;

wherein objects stored in the engineering database comprise operationally utilized production data of a technical system;

wherein the process sequences and states for at least one of querying and processing objects stored in the engineering database are stored in an order database separate from the engineering database;

wherein the process sequences and states are represented by order processing objects within the order database and comprise event-driven state transitions in an event of at least one of a query and processing of objects stored in the engineering database;

wherein objects stored in the engineering database are at least one of queried and processed by an order processing service via the order processing objects stored in the order database; and wherein access to process sequences and states stored in the order database occurs via a server-side order interface separate from the standard service interface, when the control program is running on the computer.

* * * * *